United States Patent
Moon et al.

(10) Patent No.: US 12,037,477 B2
(45) Date of Patent: *Jul. 16, 2024

(54) NEAR-INFRARED RAY ABSORBING ARTICLE AND OPTICAL APPARATUS COMPRISING THE SAME

(71) Applicant: LMS CO., LTD., Pyeongtaek-si (KR)

(72) Inventors: Sung Hwan Moon, Pyeongtaek-si (KR); Seung Man Han, Pyeongtaek-si (KR); Seon Ho Yang, Pyeongtaek-si (KR); Tae Kwang Park, Pyeongtaek-si (KR); Joon Ho Jung, Pyeongtaek-si (KR); Bo Chul Kang, Pyeongtaek-si (KR); Hee Kyeong Kim, Pyeongtaek-si (KR); Seong Don Hwang, Pyeongtaek-si (KR); Seong Yong Yoon, Pyeongtaek-si (KR); Ho Seong Na, Pyeongtaek-si (KR); Ji Tae Kim, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 860 days.

This patent is subject to a terminal disclaimer.

(21) Appl. No.: 17/108,397

(22) Filed: Dec. 1, 2020

(65) Prior Publication Data

US 2021/0191013 A1    Jun. 24, 2021

(30) Foreign Application Priority Data

Dec. 23, 2019 (KR) .......... 10-2019-0173214
Nov. 6, 2020 (KR) .......... 10-2020-0147695

(51) Int. Cl.
G02B 5/00 (2006.01)
C08K 5/29 (2006.01)
G02B 5/22 (2006.01)

(52) U.S. Cl.
CPC ............... *C08K 5/29* (2013.01); *G02B 5/003* (2013.01); *G02B 5/223* (2013.01)

(58) Field of Classification Search
CPC .......... G02B 5/003; G02B 5/22; G02B 5/208; G02B 5/223; C09B 57/00; C09B 57/007; C09B 67/0063; C08K 5/29
See application file for complete search history.

(56) References Cited

U.S. PATENT DOCUMENTS

2010/0035034 A1  2/2010  Yin
2014/0130794 A1  5/2014  Antonaia et al.
(Continued)

FOREIGN PATENT DOCUMENTS

CN  101389783 A  3/2009
CN  103782113 A  5/2014
(Continued)

OTHER PUBLICATIONS

Chinese Office Action issued on Jul. 28, 2022, in connection with the Chinese Patent Application No. 202011373793.3.
(Continued)

*Primary Examiner* — Bijan Ahvazi
(74) *Attorney, Agent, or Firm* — Hauptman Ham, LLP

(57) ABSTRACT

Provided is a near-infrared ray absorbing article. A near-infrared ray absorbing article of the present invention is capable of preventing a decrease in visible transmittance and near-infrared absorption due to the interaction between a plurality of organic materials forming light-absorbing layers. In addition, the near-infrared ray absorbing article of the present invention has the advantage of being able to be thinner. In addition, the near-infrared ray absorbing article of the present invention has the advantage of excellent mechanical properties such as strength and heat resistance.

11 Claims, 4 Drawing Sheets

(56) References Cited

U.S. PATENT DOCUMENTS

| | | | | |
|---|---|---|---|---|
| 2016/0318796 A1* | 11/2016 | Masuda | ................... | C03C 17/32 |
| 2018/0188428 A1* | 7/2018 | Arimura | ................ | G02B 5/223 |
| 2019/0055375 A1 | 2/2019 | Choi et al. | | |
| 2020/0072741 A1 | 3/2020 | Choi et al. | | |
| 2020/0241185 A1* | 7/2020 | Choi | ................... | C08K 5/3417 |
| 2021/0382213 A1* | 12/2021 | Moon | ................... | G02B 5/208 |

FOREIGN PATENT DOCUMENTS

| | | | | | |
|---|---|---|---|---|---|
| CN | 208722481 | U | | 4/2019 | |
| CN | 110194589 | A | | 9/2019 | |
| CN | 110462462 | A | | 11/2019 | |
| JP | 2007-256758 | A | | 10/2007 | |
| JP | 2007256758 | A | * | 10/2007 | ............... C09K 3/00 |
| JP | 2010-60617 | A | | 3/2010 | |
| JP | 2010060617 | A | * | 3/2010 | ............... G02B 1/10 |
| JP | 2013-125076 | A | | 6/2013 | |
| JP | 2013125076 | A | * | 6/2013 | ............... G02B 5/26 |
| JP | 2014-021131 | A | | 2/2014 | |
| JP | 2017-116687 | A | | 6/2017 | |
| JP | 2017-116775 | A | | 6/2017 | |
| JP | 2017-203902 | A | | 11/2017 | |
| JP | 2019-211764 | A | | 12/2019 | |
| JP | 2019211764 | A | * | 12/2019 | ........... C09D 201/00 |
| KR | 10-2009-0051250 | A | | 5/2009 | |
| KR | 10-2018-0101761 | A | | 9/2018 | |
| KR | 20180101761 | A | * | 9/2018 | ................ C08J 7/04 |
| KR | 10-1931731 | B1 | | 12/2018 | |
| WO | 2014/168190 | A1 | | 10/2014 | |
| WO | 2015/080043 | A1 | | 6/2015 | |
| WO | 2017/056803 | A1 | | 4/2017 | |

OTHER PUBLICATIONS

Korean Office Action issued on May 12, 2022, in connection with the Korean Patent Application No. 10-2020-0147695.

Office Action issued on Apr. 16, 2024 for corresponding Japanese Patent Application No. 2020-198784, along with an English machine translation (8 pages).

* cited by examiner

NEAR-INFRARED RAY ABSORBING ARTICLE AND OPTICAL APPARATUS COMPRISING THE SAME

CROSS-REFERENCE TO RELATED APPLICATION

This application claims priority to and the benefit of Korean Patent Application Nos. 10-2019-0173214, filed on Dec. 23, 2019, and 10-2020-0147695, filed on Nov. 6, 2020, the disclosure of which is incorporated herein by reference in its entirety.

BACKGROUND

1. Field of the Invention

The present invention relates to a near-infrared ray absorbing article and an optical apparatus including the same.

2. Discussion of Related Art

The demand for digital camera modules using image sensors is increasing significantly due to the recent expansion of the spread of smart phones and tablet PCs. The digital camera modules used in these mobile devices are evolving toward a smaller thickness and higher definition.

In the digital camera modules, video signals are received through the image sensors. Unlike the human eye, image sensors made of semiconductors respond to wavelengths in the infrared region. Therefore, in order to obtain image information similar to what the human eye sees, an infrared cut-off filter (IRCF) which blocks wavelengths in the infrared region is required.s As one example of an IRCF, (1) a reflection-type filter which is manufactured by depositing a multilayer dielectric film on a glass substrate and reflects infrared rays to only transmit light in the visible region was considered. However, since the reflection-type filter cannot absorb light in the near-infrared region, internal reflection is severe inside the camera module. The internal reflection is a main cause of an image ghosting phenomenon (a phenomenon in which a developed image is perceived as blurry or an image that does not exist in reality appears).

As another example of an IRCF, (2) an inorganic absorbing-type filter (also referred to as "blue filter") which is manufactured by depositing a multilayer dielectric film on a glass substrate (also known as "blue glass") exhibiting a blue color due to dispersion of inorganic material particles and absorbs and reflects light in the near-infrared region was considered. The blue filter is effective in suppressing the above-described ghosting phenomenon through absorption of near-infrared rays. However, since the blue filter has high brittleness and thus does not meet the technology trend of reducing the total thickness of an IRCF to 0.2 mm or less.

As still another example of an IRCF, (3) an organic absorbing-type filter which includes a transparent substrate and a plurality of organic materials (light absorbers) having absorption maxima in different wavelength ranges and is manufactured by depositing a multilayer dielectric film, and is capable of absorbing and reflecting near-infrared rays was considered. In the organic absorbing-type filter, since the wavelength of light that can be absorbed by the filter can be controlled relatively freely compared to in the inorganic absorbing-type filter, the organic absorbing-type filter is advantageous for increasing the absorption of light in the infrared region and reducing the absorption of light in the visible wavelength region. In addition, since a light-absorbing layer in which light absorbers are used is separately applied, there is no restriction in selecting a substrate, and there is an advantage in that a substrate having high strength can be freely selected. However, since the interaction between the organic materials occurs in the light-absorbing layer, the organic absorbing-type filter has problems such as a decrease in visible transmittance and a decrease in near-infrared absorption due to the interaction between the organic materials.

Therefore, there is a need to develop an IRCF capable of preventing a decrease in visible transmittance and near-infrared absorption due to the interaction between the organic materials forming the light-absorbing layer.

RELATED-ART DOCUMENT

Patent Document (Patent Document 1) Korean Laid-Open Patent Application No. 10-2009-0051250

SUMMARY OF THE INVENTION

The present invention is directed to providing a near-infrared ray absorbing article capable of preventing a decrease in visible transmittance and near-infrared ray absorption due to the interaction between a plurality of organic materials constituting a light-absorbing layer.

One aspect of the present invention provides a near-infrared ray absorbing article.

A near-infrared ray absorbing article of the present invention includes at least a glass substrate and a light-absorbing layer present on one or both surfaces of the glass substrate. In addition, in the near-infrared ray absorbing article of the present invention, a plurality of the light-absorbing layers are present.

Specifically, the near-infrared ray absorbing article of the present invention includes at least a plurality of light-absorbing layers that have different optical properties or differ in the form in which constituents thereof are present. In addition, the plurality of light-absorbing layers are separated from each other. That is, the near-infrared ray absorbing article of the present invention includes: a glass substrate, a first light-absorbing layer, and a second light-absorbing layer, wherein the first and second light-absorbing layers have different optical properties or differ in the form in which constituents thereof are present. In addition, the first and second light-absorbing layers are physically separated from each other and are present as separate (or independent) layers.

Specifically, the first and second light-absorbing layers have different optical properties. Specifically, the first light-absorbing layer and the second light-absorbing layer have absorption maxima in different wavelength ranges. As will be described below, this is because the first light-absorbing layer and the second light-absorbing layer contain different pigments.

The first light-absorbing layer has an absorption maximum at any one wavelength in the range of 850 nm to 1,200 nm. The second light-absorbing layer has an absorption maximum at any one wavelength in the range of 650 nm to 750 nm. That is, since functional layers capable of absorbing light of different wavelength bands are disposed independently of each other in the near-infrared ray absorbing article of the present invention, visible transmittance and near-infrared ray absorption can be improved. This is completely different from applying components (e.g., pigments) having different absorption maxima to only one layer. When components having different absorption maxima are applied to only one layer, due to the interaction between the components, there may be a problem that visible transmittance is decreased rather than increased and near-infrared ray transmittance is increased rather than decreased.

As used herein, the term "absorption maximum" refers to the maximum absorbance or minimum transmittance in a transmittance or absorbance spectrum plotted over a range of wavelengths, which is exhibited for a light of a specific wavelength.

Therefore, the first light-absorbing layer has maximum absorption or minimum transmittance at any one wavelength in the range of 850 nm to 1,200 nm. In addition, the second light-absorbing layer has maximum absorption or minimum transmittance at any one wavelength in the range of 650 nm to 750 nm.

A method of measuring the absorption maximum of a layer such as the first light-absorbing layer or the second light-absorbing layer is not particularly limited, and, for example, the measurement method described below in exemplary embodiments may be used.

An absorption maximum of the first or second light-absorbing layer may be measured for the first or second light-absorbing layer itself or for a laminate formed by disposing the light-absorbing layer on a known glass substrate.

In the first light-absorbing layer, particles having a specific size or less are present. That is, the first light-absorbing layer contains particles having a size (specifically, an average diameter) of 1 μm or less. As will be described below, this is because the first light-absorbing layer contains a pigment that does not dissolve in the layer. In other words, the first light-absorbing layer contains a specific polymer and a pigment dispersed in the polymer, and the pigment is dispersed under appropriate conditions.

As described above, the size of the particles is an average particle diameter of the particles. The average particle diameter may be a known volume mean diameter or a D50 particle diameter. A volume mean diameter refers to a known De Brouckere mean diameter. A D50 particle diameter refers to a median value in the particle size distribution obtained using the Stokes-Einstein relationship in a dynamic light scattering method for particles.

As described above, when the first light-absorbing layer and the second light-absorbing layer having different optical properties are separated from each other, and the first light-absorbing layer is specifically designed so that particles having an average particle diameter not exceeding a specific value are present in the first light-absorbing layer and specifically only in the first light-absorbing layer, a near-infrared ray absorbing article more suitable for objectives of the present invention, for example, the application to an IRCF having excellent visible transmittance and near-infrared ray absorption, can be provided.

On the other hand, when particles are not present in either the first light-absorbing layer or the second light-absorbing layer, or when particles are present in the first light-absorbing layer but the size (specifically, average particle diameter) of the particles exceeds the range specified in the present invention, there is a problem that the heat resistance of the first light-absorbing layer is lowered or the visible transmittance and (near-)infrared absorption of the near-infrared ray absorbing article are greatly reduced.

In another example, the average particle diameter of the particles present in the first light-absorbing layer may be 0.9 μm or less, 0.8 μm or less, 0.7 μm or less, or 0.5 μm or less, and 10 nm or more or 30 nm or more.

The light-absorbing layer included in the near-infrared ray absorbing article of the present invention may contain at least a binder resin and a pigment. The binder resin may be applied to secure fixation of the light-absorbing layer.

Meanwhile, in the present invention, since at least two types of light-absorbing layers are used and the light-absorbing layers are designed to have different optical properties or to differ in the form in which constituents thereof are present, the types and formulations of the binder resin and the pigment and the like may be appropriately changed. Hereinafter, a binder resin and a pigment contained in the first light-absorbing layer will be respectively referred to as a first binder resin and a first pigment, and a binder resin and a pigment contained in the second light-absorbing layer will be respectively referred to as a second binder resin and a second pigment. A method of forming each light-absorbing layer and the like will be described below.

Types of binder resins are not limited. In order for the light-absorbing layers to exhibit desired optical properties, it is preferable to use optically clear resin as the binder resins.

When it is stated that a material is optically clear, this may mean that the material has a light transmittance for any one wavelength in the visible range (e.g., light of a wavelength of 550 nm) of 90% or more, 95% or more, 99% or more, or about 100%.

As the binder resins, a cyclic olefin-based resin, a polyarylate-based resin, a polyisocyanate-based resin, a polyimide-based resin, a polyetherimide-based resin, a polyamideimide-based resin, a polyacrylic resin, a polycarbonate-based resin, a polyethylene phthalate-based resin, or a combination of two or more thereof may be used.

As the first binder resin and the second binder resin, the same type may be used, or different types may be used.

The first light-absorbing layer contains particles having an average particle diameter not exceeding a specific value. The formation of these particles may depend on the form in which the first pigment is present in the first light-absorbing layer containing the first pigment. That is, in the first light-absorbing layer containing the first binder resin and the first pigment, the first pigment may be dispersed in the first binder resin, and the above-described particles may be particles of the first pigment.

Here, when it is stated that a specific component is dispersed in a specific binder resin, this may mean that the specific component is not dissolved in the binder resin or a solvent mixed with the binder resin and thus can be observed with the naked eye, or that a plurality of materials including the component are regularly or irregularly dispersed in the binder resin.

The type of first pigment is not limited as long as it allows the first light-absorbing layer to exhibit the above-described optical properties (absorption maximum, etc.) and can be dispersed in the first binder resin. As the first pigment, a cyanine-based compound, a phthalocyanine-based compound, a naphthalocyanine-based compound, a porphyrin-based compound, a benzoporphyrin-based compound, a squarylium-based compound, an anthraquinone-based compound, a croconium-based compound, a dithiol metal complex compound, or a combination thereof may be used.

In the interest of most easily securing properties such as the above-described absorption maximum, it is appropriate to apply a diimmonium-based compound as the first pigment. The diimmonium-based compound may be a compound represented by Chemical Formula 1. Therefore, the first pigment may include the compound represented by Chemical Formula 1:

[Chemical Formula 1]

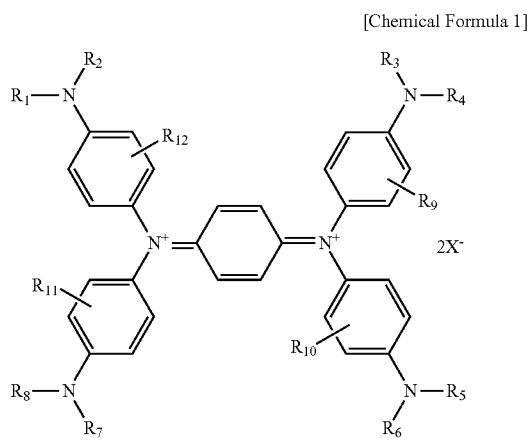

In Chemical Formula 1, $R_1$ to $R_8$ are each independently a hydrogen atom, an alkyl group, an aryl group, an aralkyl group, an alkenyl group, or an alkynyl group, $R_9$ to $R_{11}$ are each independently a hydrogen atom, a halogen group, an amino group, a cyano group, a nitro group, a carboxyl group, an alkyl group, or an alkoxy group, and X is an anion.

The anion includes, for example, $Cl^-$, $I^-$, $ClO_4^-$, $BF_4^-$, $SbF_6^-$, $CF_3SO_3^-$, $CH_3C_6H_4SO_3^-$, or the like.

The amount of first pigment in the first light-absorbing layer may be changed according to a proportion thereof in a compound applied in a method to be described below and may be appropriately adjusted to a degree at which the above-described absorption maximum can be exhibited.

The second light-absorbing layer, which has different optical properties, specifically a different absorption maximum, from the above-described first light-absorbing layer, may also contain a binder resin (second binder resin) and a pigment (second pigment). Since the second light-absorbing layer has different optical properties from the first light-absorbing layer, at least the second pigment may differ from the first pigment in the form in which it is present and/or may be a different type from the first pigment.

Whereas the first pigment may be dispersed in a process of forming the first light-absorbing layer and is present, for example, in the form of particles, the second pigment may be dissolved in a process of forming the second light-absorbing layer. As a result, in the second light-absorbing layer, the second pigment may color the second binder resin. That is, the second light-absorbing layer may contain a second binder resin and a second pigment that colors the second binder resin. When it is stated that a specific pigment colors a specific resin, this may mean that the resin takes the color of the pigment. That is, unlike in the first light-absorbing layer, particles may not be present in the second light-absorbing layer, and specifically, since a pigment is dissolved in the manufacturing process of the second light-absorbing layer, the second pigment may color the second binder resin in the second light-absorbing layer.

Like the first pigment, the type of second pigment is also not limited. As the second pigment, any known pigment may be used as long as it allows the second light-absorbing layer to exhibit the above-described optical properties (absorption maximum, etc.).

Since an absorption maximum of a light-absorbing layer is usually determined by the optical properties of a pigment, and the first light-absorbing layer and the second light-absorbing layer have different absorption maxima, as the second pigment, a cyanine-based compound, a phthalocyanine-based compound, a naphthalocyanine-based compound, a porphyrin-based compound, a benzoporphyrin-based compound, a squarylium-based compound, an anthraquinone-based compound, a croconium-based compound, a dithiol metal complex compound, or a combination thereof that is different from the first pigment may be used. In the interest of allowing the second light-absorbing layer to exhibit the above-described absorption maximum, a pigment including a squarylium-based compound may be used as the second pigment. The squarylium-based compound may be a compound represented by Chemical Formula 2. That is, the second pigment may include the compound represented by Chemical Formula 2:

[Chemical Formula 2]

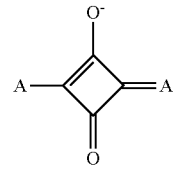

A is an aminophenyl group, an indolyl methylene group, an indolinyl group, or a perimidine group, and two A's centered about

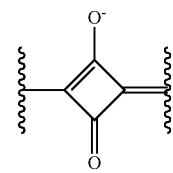 [SMILES: *C1=C([O-])C(=*)C1=O]

are conjugated with each other, and any one or more of hydrogens present in the aminophenyl group, indolyl methylene group, indolinyl group, or perimidine group are each independently hydrogen, a halogen group, a hydroxyl group, a cyano group, a nitro group, a carboxyl group, a C1-C20 alkyl group, a C3-C20 cycloalkyl group, a C1-C10 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group.

In addition, in Chemical Formula 2, when any one or more of the hydrogens present in the aminophenyl group, indolyl methylene group, indolinyl group, or perimidine group are each independently an aryl group, the aryl group may be additionally substituted with a C1-C4 alkyl group or a C1-C4 alkoxy group.

The compound represented by Chemical Formula 2 may be specifically any one of compounds represented by Chemical Formulas 2a to 2d:

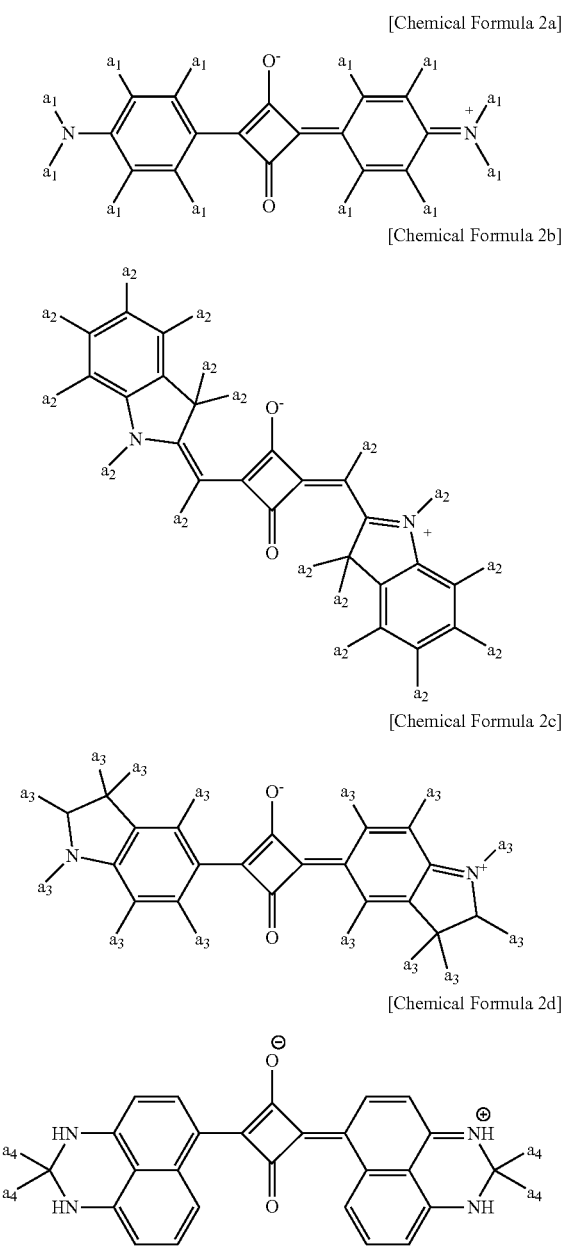

[Chemical Formula 2a]

[Chemical Formula 2b]

[Chemical Formula 2c]

[Chemical Formula 2d]

In Chemical Formulas 2a to 2d, $a_1$, $a_2$, $a_3$, and $a_4$ are each independently hydrogen, a halogen group, a hydroxyl group, a cyano group, a nitro group, a carboxyl group, a C1-C20 alkyl group, a C3-C10 cycloalkyl group, a C1-C6 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group.

In Chemical Formulas 2a to 2d, when $a_1$, $a_2$, $a_3$, and $a_4$ are each independently a C6-C20 aryl group, one or more hydrogens of the aryl group may be additionally substituted with a C1-C4 alkyl group or a C1-C4 alkoxy group.

As used herein, the term "alkyl group" may refer to a substituent derived from a saturated hydrocarbon having a straight or branched chain. As the alkyl group, for example, a methyl group, an ethyl group, an n-propyl group, an isopropyl group, an n-butyl group, a sec-butyl group, a tert-butyl group, an n-pentyl group, a 1,1-dimethylpropyl group, a 1,2-dimethylpropyl group, a 2,2-dimethylpropyl group, a 1-ethylpropyl group, a 2-ethylpropyl group, an n-hexyl group, a 1-methyl-2-ethylpropyl group, a 1-ethyl-2-methylpropyl group, a 1,1,2-trimethylpropyl group, a 1-propylpropyl group, a 1-methylbutyl group, a 2-methylbutyl group, a 1,1-dimethylbutyl group, a 1,2-dimethylbutyl group, a 2,2-dimethylbutyl group, a 1,3-dimethylbutyl group, a 2,3-dimethylbutyl group, a 2-ethylbutyl group, a 2-methylpentyl group, a 3-methylpentyl group, or the like may be used. In addition, the alkyl group may refer to a C1-C20, C1-C12, C1-C6, or C1-C4 alkyl group.

As used herein, the term "cycloalkyl group" may refer to a substituent derived from a monocyclic saturated hydrocarbon. As the cycloalkyl group, for example, a cyclopropyl group, a cyclobutyl group, a cyclopentyl group, a cyclohexyl group, a cycloheptyl group, a cyclooctyl group, or the like may be used. In addition, the cycloalkyl group may refer to a C3-C20, C3-C12, C3-C9, or C3-C6 cycloalkyl group.

As used herein, the term "aryl group" refers to a monovalent substituent derived from an aromatic hydrocarbon. As the aryl group, for example, a phenyl group, a naphthyl group, an anthracenyl group, a phenanthryl group, a naphthacenyl group, a pyrenyl group, a tolyl group, a biphenyl group, a terphenyl group, a chrycenyl group, a spirobifluorenyl group, a fluoranthenyl group, a fluorenyl group, a perylenyl group, an indenyl group, an azulenyl group, a heptalenyl group, a phenalenyl group, a phenanthrenyl group, or the like may be used. In addition, the aryl group may refer to a C6-C30, C6-C24, C6-C18, or C6-C12 aryl group.

As used herein, the term "aralkyl group" may refer to a monovalent substituent derived from a saturated hydrocarbon compound in which a monovalent substituent derived from an aromatic hydrocarbon is bonded to a hydrogen site of a terminal hydrocarbon. That is, the aralkyl group refers to an alkyl group whose chain ends are substituted with an aryl group. Examples of the aralkyl group may include a benzyl group, a methylbenzyl group, a phenethyl group, a phenylpropyl group, a naphthalenylmethyl group, a naphthalenylethyl group, and the like.

As described above, in the near-infrared ray absorbing article of the present invention, in the interest of realizing appropriate optical properties (e.g., improved transmittance for light in the visible region, maximum absorption of light in the near-infrared region, etc.) of the near-infrared ray absorbing article, the first light-absorbing layer and the second light-absorbing layer may be configured as independent layers and may be designed so that the first pigment of the first light-absorbing layer and the second pigment of the second light-absorbing layer are not mixed, but disposition thereof may be appropriately controlled.

As in the above, when it is stated that the first light-absorbing layer and the second light-absorbing layer are configured as layers which are independent of each other or separated from each other, this may mean that the first light-absorbing layer and the second light-absorbing layer are disposed so that constituents thereof, specifically the first pigment and the second pigment, are not mixed.

It is known that there are various ways of disposing the first light-absorbing layer and the second light-absorbing layer so that they are separated from each other. For example, in the near-infrared ray absorbing article of the present invention, the first light-absorbing layer is disposed so that it is present on one surface of the glass substrate, and the second light-absorbing layer is disposed so that it is present on the other surface of the glass substrate, and therefore, the first light-absorbing layer and the second light-absorbing layer may be disposed so that they are present while being separated from each other. That is, the first light-absorbing layer (or the second light-absorbing layer) may be present on the surface opposite the second light-absorbing layer (or the first light-absorbing layer) based on the glass substrate.

In the near-infrared ray absorbing article of the present invention, the first light-absorbing layer and the second light-absorbing layer may be laminated on one surface of the glass substrate. Specifically, the near-infrared ray absorbing article of the present invention may include the glass substrate, the first light-absorbing layer, and the second light-absorbing layer in the order as written, or may include the glass substrate, the second light-absorbing layer, and the first light-absorbing layer in the order as written.

FIGS. 1 and 2 illustrate such a laminated structure. A near-infrared ray absorbing article of the present invention may have a structure in which a first light-absorbing layer 200, a glass substrate 100, and a second light-absorbing layer 300 are present in the order as written (see FIG. 1) or may have a structure in which a second light-absorbing layer 300, a glass substrate 100, and a first light-absorbing layer 200 are present in the order as written (see FIG. 2).

In addition, as described above, the first light-absorbing layer and the second light-absorbing layer may be laminated on one surface of the glass substrate. The near-infrared ray absorbing article may have, for example, a structure in which a glass substrate 100, a first light-absorbing layer 200, and a second light-absorbing layer 300 are present in the order as written (see FIG. 3) or may have a structure in which a glass substrate 100, a second light-absorbing layer 300, and a first light-absorbing layer 200 are present in the order as written. Suitably, the near-infrared ray absorbing article preferably has a structure which includes the glass substrate 100, the first light-absorbing layer 200, and the second light-absorbing layer 300 in the order as written (see FIG. 3).

Meanwhile, when the first pigment and the second pigment are mixed, since the optical properties or the like of the light-absorbing layer may be degraded, such a laminated structure (laminated structure of glass substrate/second light-absorbing layer/first light-absorbing layer or glass substrate/first light-absorbing layer/second light-absorbing layer) needs to be configured such that, particularly, the first light-absorbing layer and the second light-absorbing layer are clearly separated from each other. For example, the first and second light-absorbing layers may be separately formed and then laminated, or a separation layer 400 may be separately introduced between the first and second light-absorbing layers so that the first light-absorbing layer and the second light-absorbing layer are separated from each other (see FIG. 4).

The separation layer refers to a known functional layer that functions to prevent mixing of the constituents of the first light-absorbing layer and the constituents of the second light-absorbing layer. For example, a known barrier film or the like may be used as the separation layer, and in another example, the separation layer may be formed with a known adhesive. In the present invention, an adhesive layer capable of attaching the first light-absorbing layer and the second light-absorbing layer to each other is used as the separation layer. As used herein, the term "adhesion," as it is known, may refer to a phenomenon in which two materials are brought into contact with each other and attached to each other through physical and/or chemical bonding, and the term "adhesive" may refer to a known chemical material manufactured so as to form a state in which the adhesive and a surface of an adherend are bonded by the bonding force at the interface.

In general, the adhesive layer may be formed by curing or crosslinking an adhesive composition including an adhesive resin and the like. The type of resin for forming the adhesive layer is not particularly limited and may be freely selected from among the known adhesive resins within a range that ensures appropriate adhesion between the first light-absorbing layer and the second light-absorbing layer. For example, the resin for forming the adhesive layer may be one or more selected from among a cyclic olefin-based resin, a polyacrylate-based resin, a polyisocyanate-based resin, a polyimide-based resin, a polyetherimide-based resin, a polyamideimide-based resin, an acrylic resin, a polycarbonate-based resin, and a polyethylene naphthalate-based resin.

In the above, in the interest of preventing the mixing of the first pigment of the first light-absorbing layer and the second pigment of the second light-absorbing layer, the thickness of the separation layer (e.g., adhesive layer, adhesive material layer, etc.) may also be appropriately controlled.

The thickness of each of the light-absorbing layers is also not particularly limited and may be appropriately controlled within a range capable of forming an average near-infrared ray absorbing article thickness to be described below. The thickness of each of the first light-absorbing layer and the second light-absorbing layer may be, for example, in the range of 0.25 μm to 10 μm. In another example, the thickness may be 0.5 μm or more and 5 μm or less. The thicknesses of the first light-absorbing layer and the thickness of the second light-absorbing layer may be the same or different from each other.

In the present invention, when a specific member does not have a uniform thickness throughout, a maximum thickness, a minimum thickness, or an average of the maximum and minimum thicknesses of the member may be referred to as the thickness of the member.

A method of forming the light-absorbing layer is not particularly limited. For example, the light-absorbing layer may be formed by curing a composition for forming a light-absorbing layer. The curing method is not particularly limited, and a known curing method such as a thermal-curing method, a photocuring method, or a dual-curing method using heat and light may be used. That is, the light-absorbing layer may contain a cured product of a composition for forming a light-absorbing layer.

A composition for forming the first light-absorbing layer and a composition for forming the second light-absorbing layer may contain a pigment and a solvent. Specifically, the composition for forming the first light-absorbing layer may contain at least the first pigment and a first solvent. The composition for forming the second light-absorbing layer may include at least the second pigment and a second solvent.

As described above, since particles are present in the first light-absorbing layer and the particles may be particles of the first pigment, it is preferable that the first pigment used in the composition for forming the first light-absorbing layer has low solubility, that is, a solubility not exceeding a specific value, in the first solvent. In the second light-absorbing layer, since the second pigment may be dissolved and color the binder resin in the process of forming the second light-absorbing layer, it is preferable that the second pigment has high solubility, that is, a solubility of no less than a specific value, in the second solvent.

The solubility refers to a ratio (g/L) of the mass (g) of a dissolved solute to the unit volume (L) of a solvent. The solubility is measured at room temperature.

"Room temperature" refers to a natural temperature that has not been particularly raised or lowered. For example, room temperature may refer to a temperature in the range of 15° C. to 30° C., any one temperature in the range of 20° C. to 25° C., or a temperature of about 23° C.

The first pigment may have a solubility of 15 g/L or less in the first solvent. In another example, the solubility may be 0 g/L or more, 0.001 g/L or more, 0.01 g/L or more, or 0.1 g/L or more, and 14 g/L or less, 13 g/L or less, 12 g/L or less, 11 g/L or less, 10 g/L or less, 9 g/L or less, 8 g/L or less, 7 g/L or less, 6 g/L or less, 5 g/L or less, 3 g/L or less, 2 g/L or less, or 1 g/L or less. When it is stated that the solubility of a solute in a solvent is 0 g/L, this may mean that the solute is not dissolved in the solvent at all. In the first light-absorbing layer, the first pigment is dispersed rather than dissolved, and in this case, in the interest of improving the dispersibility of the first pigment, it is preferable that an appropriate amount of a commercially available dispersant is added. The type of dispersant is not particularly limited, and any commercially available dispersant capable of improving the visible transmittance and near-infrared ray absorption of a light-absorbing layer and securing an appropriate dispersibility of the first pigment may be appropriately selected.

The second pigment may have a solubility of more than 15 g/L in the second solvent. Since the second pigment has sufficient solubility to dissolve in the second in the second solvent, the upper limit of solubility of the second pigment in the second solvent is not limited.

Types of first and second solvents are not particularly limited, and one of the known solvents, specifically one of organic solvents, may be freely selected as long as the solvent satisfies the solubility conditions for the first and second pigments. Specifically, in the composition for forming the first light-absorbing layer and the composition for forming the second light-absorbing layer, as each of the first and second solvents, methyl isobutyl ketone, propylene glycol methyl ether acetate, diethylene glycol monoethyl ether, 3-methoxy butanol, ethylene glycol monobutyl ether acetate, 4-hydroxy-4-methyl-2-pentanone, gamma-butyrolactone, cyclohexanone, toluene, pyridone, or the like may be used.

When the compositions for forming the first and second light-absorbing layers are prepared and cured independently of each other, the first light-absorbing layer and the second light-absorbing layer can be obtained, and when the first and second light-absorbing layers are disposed in the order as written in the above, the near-infrared ray absorbing article of the present invention can be obtained. Although a composition for forming a light-absorbing layer used in the present invention includes a binder resin, a pigment, and a solvent, and a light-absorbing layer is formed by curing the compound, since the solvent is usually evaporated during the curing process, it is common that the light-absorbing layer does not contain the solvent. That is, the light-absorbing layer may contain the binder resin and the pigment as major components and hardly contain the solvent, and even when the solvent is contained, the amount thereof may be very small.

The proportions of the first pigment and the second pigment are not particularly limited. For example, the proportions of the first pigment and the second pigment may be in the range of 0.01 parts by weight to 10 parts by weight, 0.01 parts by weight to 8 parts by weight, or 0.01 parts by weight to 5 parts by weight based on 100 parts by weight of their respective binder resins, when the compositions include binder resins. The proportion of each of the first pigment and the second pigment may refer to the proportion thereof in the first light-absorbing layer or the second light-absorbing layer or may refer to the proportion thereof in the composition for forming the first light-absorbing layer or the composition for forming the second light-absorbing layer.

In the interest of ensuring that the first light-absorbing layer and/or the second light-absorbing layer secure(s) an additional absorption maximum besides the above-described absorption maximum(s) that the first pigment and/or the second pigment have/has, the first light-absorbing layer and/or the second light-absorbing layer may additionally contain a specific pigment (pigment other than the first pigment and the second pigment). In this case, the proportion of the additionally used specific pigment in the composition for forming a light-absorbing layer may be in the range of 0.01 parts by weight to 5 parts by weight based on 100 parts by weight of a binder used in the composition. When one type of pigment is additionally used, the proportion may refer to the proportion of the one type of pigment, and when a combination of a plurality of pigments is additionally used, the proportion may refer to the proportions of the pigments.

The type of pigment that can be additionally used is not particularly limited. As the additional pigment, one or more selected from among a light absorber in the ultraviolet region and a dye, colorant, or metal complex-based compound having an absorption maximum in the ultraviolet region may be used. Specifically, examples of the additional pigment may include indole-based, oxazole-based, merocyanine-based, cyanine-based, naphthalimide-based, oxadiazole-based, oxazine-based, oxazolidine-based, naphthalic acid-based, styryl-based, anthracene-based, cyclic carbonyl-based, triazole-based, phthalocyanine-based, naphthalocyanine-based, porphyrin-based, benzoporphyrin-based, squarylium-based, anthraquinone-based, chroconium-based, dithiol metal complex-based pigments, and the like. One type of these specific pigments may be used in the first light-absorbing layer or the second light-absorbing layer, and in some cases, a combination of two or more types of these specific pigments may be used.

The near-infrared ray absorbing article of the present invention includes a glass substrate. The glass substrate is used for securing appropriate mechanical properties of the near-infrared ray absorbing article, such as strength.

The thickness of the glass substrate may also be appropriately controlled in the interest of securing appropriate mechanical properties of the near-infrared ray absorbing article. The thickness of the glass substrate may be in the range of 0.07 mm to 0.3 mm. As described above, the thickness may refer to a maximum thickness, a minimum thickness, or an average of the maximum and minimum thicknesses of the glass substrate. In another example, the thickness may be in the range of 0.07 mm to 0.2 mm.

In the interest of securing improved mechanical properties of the near-infrared ray absorbing article, a tempered glass substrate may be used as the glass substrate.

The type of glass substrate that can be used as the tempered glass substrate is not particularly limited, and physically strengthened tempered glass or chemically strengthened tempered glass may be used, and chemically strengthened tempered glass is preferably used.

The tempered glass substrate may include a first compressive stress layer which is present on a first main surface of the glass substrate and a second compressive stress layer which is present on a second main surface, that is, a main surface opposite the first main surface. Since a glass substrate strengthened by these compressive stress layers is used, the near-infrared ray absorbing article of the present invention can have improved strength. In addition, the high weather resistance of an imaging device in which an optical apparatus having the near-infrared ray absorbing article is used can be secured.

A method of forming the compressive stress layers is not particularly limited, and any known method of physically strengthening or chemically strengthening a glass substrate may be used. However, in the interest of minimizing the damage to a glass substrate, the compressive stress layers may be formed by a chemical strengthening method. The above-described compressive stress layer may refer to a portion in which $Na^+$ ions of the original glass substrate containing $Na^+$ ions are replaced with $K^+$ ions. In this process, the layer corresponding to a portion starting from one surface of the glass substrate and substituted with the $K^+$ ions is defined as the compressive stress layer. In general, the compressive stress layer is known as a depth of compressive stress layer (DOL). That is, since the compressive stress layer is formed when a component of the glass substrate is replaced with another component by an external treatment such as the application of heat, the compressive stress layer may be formed toward the inside of the glass substrate (this is in the same context as referring the compressive stress layer to as a DOL).

The thickness of each of the first compressive stress layer and the second compressive stress layer that the tempered glass substrate includes may be 30% of the total thickness of the near-infrared ray absorbing article or less.

The thickness of each of the first compressive stress layer and the second compressive stress layer may be in the range of 1 μm to 30 μm. In another example, the thickness may be in the range of 5 μm to 30 μm, 10 μm to 20 μm, or 15 μm to 20 μm. Since a tempered glass substrate including compressive stress layers formed to a thickness satisfying this range is used, the near-infrared ray absorbing article of the present invention can have excellent strength while having a small thickness.

As described above, when the compressive stress layer does not have a uniform thickness throughout, a maximum thickness, a minimum thickness, or an average of the maximum and minimum thicknesses of the compressive stress layer may be referred to as the thickness of the compressive stress layer.

The compressive stress of the glass substrate may also be controlled. The substrate may have a three-point flexural strength of, for example, 360 MPa or more, as measured in accordance with the ASTM D790 measurement standard. In another example, the three-point flexural strength may be 370 MPa or more, 380 MPa or more, 390 MPa or more, 400 MPa or more, 410 MPa or more, 420 MPa or more, 430 MPa or more, 440 MPa or more, 450 MPa or more, 460 MPa or more, 470 MPa or more, 480 MPa or more, 490 MPa or more, or 500 MPa or more.

The near-infrared ray absorbing article of the present invention may additionally include a known functional layer. For example, the substrate, the light-absorbing layers, and the like may be bonded to one another through the above-described type of adhesive layer.

In addition, the near-infrared ray absorbing article of the present invention may have a small thickness. Therefore, the thickness of the near-infrared ray absorbing article may be, for example, 0.3 mm or less, 0.23 mm or less, or 0.22 mm or less. In another example, the thickness may be in the range of 0.08 mm to 0.15 mm. As described above, when the near-infrared ray absorbing article does not have a uniform thickness throughout, a maximum thickness, a minimum thickness, or an average of the maximum and minimum thicknesses may be referred to as the thickness of the near-infrared ray absorbing article.

Another aspect of the present invention provides an optical apparatus. Specifically, the optical apparatus may be an optical filter and more specifically a near-infrared cut-off filter. The optical apparatus includes the above-described near-infrared ray absorbing article and a selective wavelength reflection layer present on one or both surfaces of the near-infrared ray absorbing article.

As used herein, the term "selective wavelength reflection layer" may refer to a functional optical member formed to reflect light of a specific wavelength while transmitting rather than reflecting light having a different wavelength from the reflected light. Specifically, the selective wavelength reflection layer used in an optical apparatus of the present invention may refer to a functional layer designed such that the selective wavelength reflection layer reflects light having a wavelength of 650 nm or more, for example, light having a wavelength in the range of 700 nm to 1,200 nm, among the light incident on the optical apparatus and thus blocks light in this wavelength range so that the light cannot be transmitted through the optical apparatus and/or prevents light having a wavelength in the range of 400 nm to 650 nm from being reflected, that is, allows light in this wavelength range to be transmitted. That is, the selective wavelength reflection layer may serve as a near-infrared reflection layer for reflecting near-infrared rays and/or an anti-(visible-light) reflection layer for preventing visible light from being reflected.

The selective wavelength reflection layer may include a multilayer dielectric film. That is, the optical apparatus of the present invention may be formed by forming a multilayer dielectric film on one or both surfaces of the above-described near-infrared ray absorbing article.

The multilayer dielectric film may have a structure in which dielectric films having different refractive indices are alternately formed. For example, the dielectric films may be formed by repeating the order of low refractive index-high refractive index-low reflective index dielectric films or high refractive index-low refractive index-high reflective index dielectric films, which is repeated. A difference in refractive index between the high refractive index dielectric layer and the low refractive index dielectric layer may be 0.2 or more, 0.3 or more, 0.4 or more, or 0.5 or more, and 1.5 or less or 1.0 or less. Here, a reference wavelength for the refractive indices may be 550 nm.

The refractive index of the low refractive index dielectric film may be in the range of 1.4 to 1.6. Examples of a low refractive index dielectric film having this refractive index value may include silicon dioxide, lanthanum fluoride, magnesium fluoride, sodium aluminum hexafluoride, and the like. Here, a reference wavelength for the refractive index may be 550 nm.

The refractive index of the high refractive index dielectric film may be in the range of 2.1 to 2.5. Examples of a high refractive index dielectric film having this refractive index value may include titanium dioxide, aluminum oxide, zirconium oxide, tantalum pentoxide, niobium pentoxide, lanthanum oxide, yttrium oxide, zinc oxide, zinc sulfide, indium oxide, and the like, wherein the indium oxide may include titanium dioxide, tin oxide, cerium oxide, and the like. Here, a reference wavelength for the refractive index may be 550 nm.

In the optical apparatus, the high refractive index dielectric film and the low refractive index dielectric film may be formed to be separated from each other. In one example, a high refractive index dielectric film or a low refractive index dielectric film may be present on one surface of the near-infrared ray absorbing article while a low refractive index dielectric film or a high refractive index dielectric film is present on the other surface. In another example, a high refractive index dielectric film and a low refractive index dielectric film may be present, in the order as written or in reverse order, on one surface of the near-infrared ray absorbing article, and the above-described separation layer may be present between the high refractive index dielectric film and the low refractive index dielectric film.

Still another aspect of the present invention provides an imaging device. The imaging device includes the above-described optical apparatus (specifically, an optical filter such as a near-infrared cut-off filter) or the above-described near-infrared ray absorbing article.

The imaging device may include all known essential components for imparting functions to the imaging device. For example, the imaging device may include a lens and an image sensor in addition to the above-described optical apparatus or the above-described near-infrared ray absorbing article.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
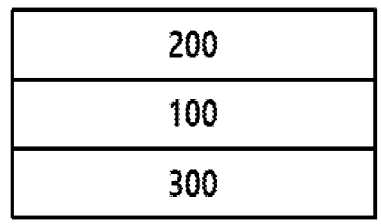
FIGS. 1 to 4 illustrate laminated structures of near-infrared ray absorbing articles according to exemplary embodiments of the present invention.
Figure 2:
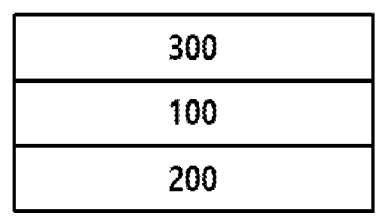
Figure 3:
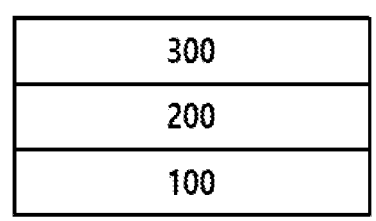
Figure 4:
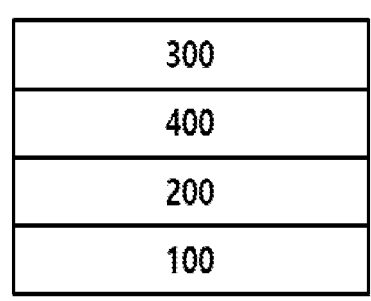

Hereinafter, the present invention will be described in detail through Examples and Comparative Examples. However, the scope of the present invention is not limited by Examples and Comparative Examples described below.

<Measurement of Light Transmittance>

The transmittance of the resultants of Preparation Examples, Examples, and Comparative Examples according to wavelength was measured, using a spectrophotometer (Lambda 750 spectrophotometer commercially available from PerkinElmer Inc.), in accordance with the user's manual for the instrument.

<Measurement of Haze>

The haze of the resultants of Preparation Examples 6 to 13 for light having a wavelength of 550 nm was measured, using a haze meter (NDH 2000N commercially available from Nippon Denshoku Industries Co., Ltd.), by the JIS K 7136 test method in accordance with the user's manual for the instrument.

<Particle Size Analysis>

The average particle diameter of the particles of Preparation Examples, Examples, and Comparative Examples was calculated as a median value (D50) in the particle size distribution measured using a nanoSAQLA instrument (commercially available from Otsuka Electronics Co., Ltd.).

<Products Used>

The following is information on main products used in Preparation Examples, Comparative Examples, and Examples.

Aluminosilicate glass: AS 87 commercially available from Schott AG

Polyacrylate-based binder resin: Sumipex commercially available from Sumitomo Chemical Co., Ltd.

First pigment: IRA 1032 (diimmonium-based compound) commercially available from Exciton Second pigment: IRA 705 (squarylium-based compound) commercially available from Exciton Third pigment: ADA3232 (compound having an absorption maximum in the wavelength range of 300 nm to 400 nm) commercially available from H.W. Sands Corp.

Fourth pigment: S 0094 (cyanine-based compound having an absorption maximum in the wavelength range of 800 nm to 850 nm) commercially available from FEW Chemicals GmbH Dispersant: Disperbyk-110 commercially available from BYK

PREPARATION EXAMPLE 1

Formation of Light-Absorbing Layer

A light-absorbing layer specimen was prepared according to the following method:

(1) The aluminosilicate glass was washed with an aqueous alkali solution to obtain a glass substrate having a thickness of about 0.1 mm.

(2) The glass substrate was immersed in a potassium nitrate solution and the solution was thermally treated at a temperature of 390° C. for about 40 minutes, and thereby a tempered glass substrate including a first compressive stress layer and a second compressive stress layer, each having a thickness of about 17.5 formed on each surface of the glass substrate was obtained.

(3) A composition for forming a light-absorbing layer was prepared by mixing the polyacrylate-based binder, and 3 parts by weight of the first pigment and about 500 parts by weight of methyl isobutyl ketone based on 100 parts by weight of the polyacrylate-based binder.

(4) The composition for forming a light-absorbing layer was applied onto one surface of the tempered glass substrate by spin-coating and thermally cured at 140°

C. for about two hours, and thereby a light-absorbing layer having a thickness of about 3 μm was obtained.

PREPARATION EXAMPLE 2

Formation of Light-Absorbing Layer

A light-absorbing layer was formed in the same manner as in Preparation Example 1 except that, in the step (3), a composition for forming a light-absorbing layer was prepared using the second pigment at 5 parts by weight instead of the first pigment.

PREPARATION EXAMPLE 3

Formation of Light-Absorbing Layer

A light-absorbing layer was formed in the same manner as in Preparation Example 1 except that, in the step (3), a mixture of 5 parts by weight of the second pigment, 3 parts by weight of the third pigment, and 0.1 parts by weight of the fourth pigment was used instead of the first pigment.

Figure 5:
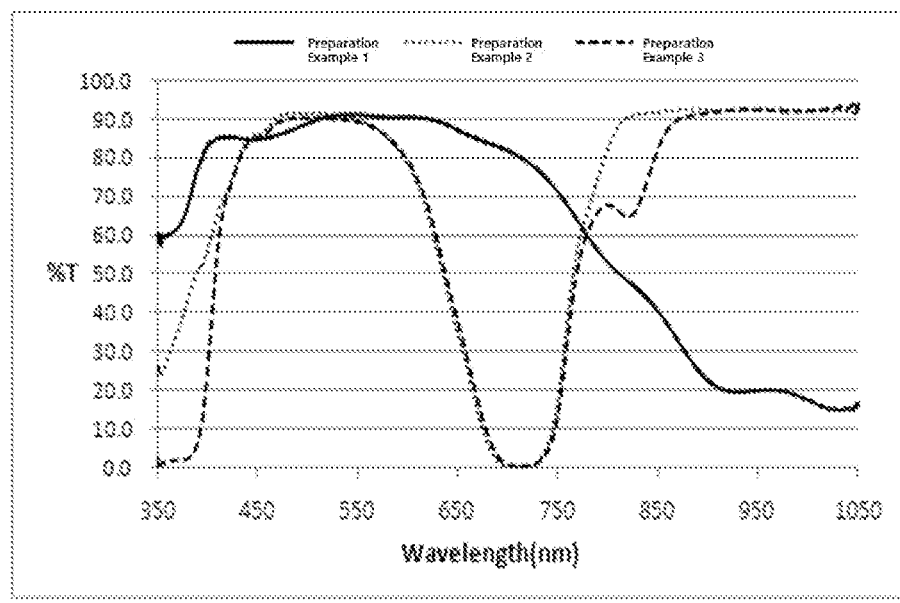
FIG. 5 is a set of transmittance spectra of Preparation Examples 1 to 3 of the present invention.

The transmittance spectra obtained from the light-absorbing layer specimens prepared in Preparation Examples 1 to 3 are shown in FIG. 5. Referring to FIG. 5, it can be seen that the first pigment has an absorption maximum in the wavelength range of 850 nm to 1,200 nm (Preparation Example 1) and the second pigment has an absorption maximum in the wavelength range of 650 nm to 750 nm (Preparation Example 2), and when the second pigment is mixed with an additional specific pigment, due to the added pigment, additional absorption maxima are exhibited even in the wavelength ranges of 300 nm to 400 nm and 800 nm to 850 nm without a decrease in visible transmittance and near-infrared absorption (Preparation Example 3).

PREPARATION EXAMPLE 4

Formation of Light-Absorbing Layer

A light-absorbing layer was formed in the same manner as in Preparation Example 1 except that, in the step (3), a composition for forming a light-absorbing layer was prepared by mixing the polyacrylate-based binder, and 5 parts by weight of the first pigment and about 500 parts by weight of methyl isobutyl ketone based on 100 parts by weight of the polyacrylate-based binder, adding the dispersant at 0.2 parts by weight to the mixture, dispersing particles for about six hours using dispersion equipment and 0.5 mm zirconia beads, and after confirming the presence of appropriately-sized particles using a particle size analyzer, passing the resultant through a filter. In the light-absorbing layer of Preparation Example 4, the diimmonium-based pigment (i.e., first pigment) was present in the form of particles.

PREPARATION EXAMPLE 5

Formation of Light-Absorbing Layer

A light-absorbing layer was formed in the same manner as in Preparation Example 4 except that, in the step (3), a composition for forming a light-absorbing layer, in which the first pigment was present in a dissolved state, was prepared using cyclohexanone instead of methyl isobutyl ketone. In the case of the light-absorbing layer of Preparation Example 5, the first pigment was dissolved and colored the binder resin.

Figure 6:
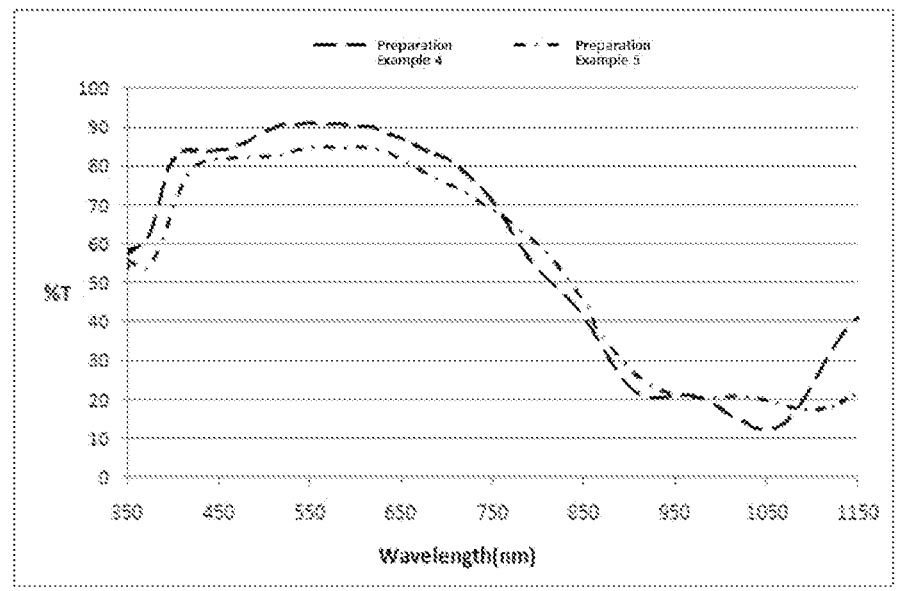
FIG. 6 is a set of transmittance spectra of Preparation Examples 4 and 5.

The transmittance spectra obtained from the light-absorbing layers of Preparation Examples 4 and 5 are shown in FIG. 6, and the transmittance in main wavelength ranges is shown in Table 1. It can be seen that the transmittance in the visible region (450 nm to 700 nm) and the absorbance in the near-infrared region (about 1,050 nm) were higher in the light-absorbing layer of Preparation Example 4 than in the light-absorbing layer of Preparation Example 5. It was confirmed that this was because the dissolution of the first pigment had caused degradation of a light-absorbing layer containing the first pigment.

Through this, it can be seen that when the first pigment used in the present invention is dispersed rather than dissolved and is present in the form of particles in the light-absorbing layer, a light-absorbing layer having both high visible transmittance and high infrared absorbance can be formed.

TABLE 1

| | Light transmittance (T %) | | |
|---|---|---|---|
| Classification | @425 nm | @550 nm | @1,050 nm |
| Preparation Example 4 | 84.5 | 91.5 | 12.4 |
| Preparation Example 5 | 79.5 | 84.5 | 19.8 |

PREPARATION EXAMPLE 6

Formation of Light-Absorbing Layer

A light-absorbing layer was formed in the same manner as in Preparation Example 4 except that, in the step (3), a solvent type and dispersion conditions were controlled as shown in Table 2, and after confirming the presence of particles having an average particle diameter of about 0.1 μm using a particle size analyzer, filtration was performed.

PREPARATION EXAMPLES 7 TO 13

Formation of Light-Absorbing Layer

A light-absorbing layer was formed in the same manner as in Preparation Example 6 except that the average particle diameter of the first pigment, which is present in the form of particles in the light-absorbing layer, was controlled as shown in Table 2. In this case, the average particle diameter of the diimmonium-based pigment particles was implemented by controlling a solvent type used for forming the light-absorbing layer and controlling a rotational speed (RPM) and time as shown in Table 2 in the dispersion process performed using mechanical dispersion equipment (bead mill for wet grinding and dispersing commercially available from NETZSCH-Feinmahltechnik GmbH).

Figure 7:
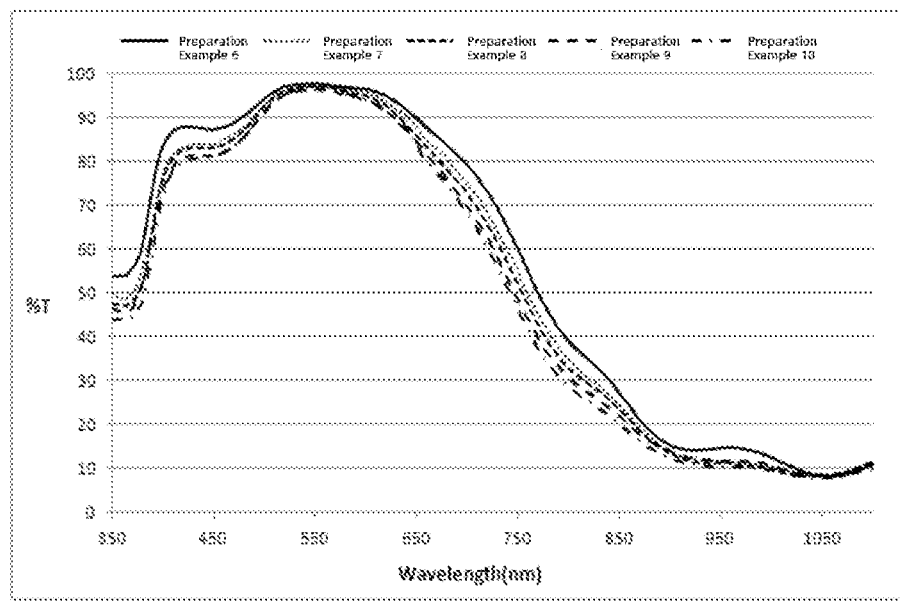
FIGS. 7 and 8 are transmittance spectra of Preparation Examples 6 to 13.
Figure 8:
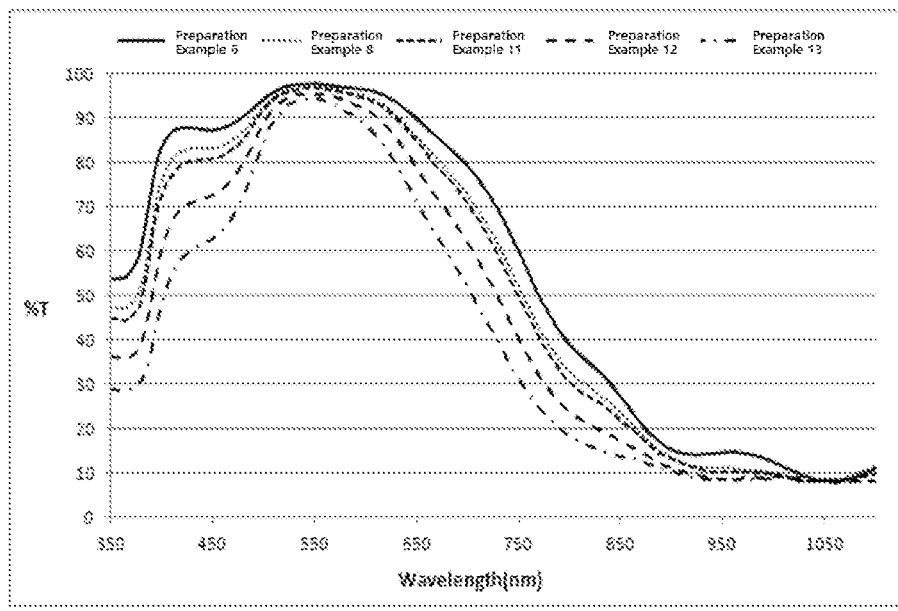

The transmittance spectra of the light-absorbing layers of Preparation Examples 6 to 13 are shown in FIGS. 7 and 8, and the dispersion conditions, transmittance at main wavelengths, and haze of each Preparation Example are shown in Table 2.

TABLE 2

| | | Dispersion conditions (bead mill commercially available from NETZSCH-Feinmahltechnik GmbH) | | | | Average particle | Transmittance (%) | | | Haze |
|---|---|---|---|---|---|---|---|---|---|---|
| Classification | Solvent | Number of revolutions (rpm) | Injected amount (ml/min) | Bead Size (mm) | Dispersion time (hr) | diameter (μm) | @425 nm | @550 nm | @1,050 nm | (%) |
| Preparation Example 6 | MIBK | 3,000 | 200 | 0.5 | 6 | 0.1 | 88 | 98 | 8 | 0.05 |
| 7 | EAc | 3,000 | 200 | 0.5 | 3 | 0.5 | 86 | 97.5 | 8 | 0.1 |
| 8 | Xylene | 3,000 | 200 | 0.5 | 6 | 1.1 | 84 | 97 | 8 | 0.4 |
| 9 | Toluene | 3,000 | 200 | 0.5 | 6 | 1.3 | 81 | 96.5 | 8 | 0.5 |
| 10 | PGMEA | 3,000 | 200 | 0.5 | 6 | 1.5 | 80 | 96 | 8 | 0.6 |
| 11 | PGMEA | 3,000 | 200 | 0.1 | 3 | 2 | 79.5 | 95.9 | 8 | 0.75 |
| 12 | EAc | 3,000 | 200 | 0.8 | 6 | 3 | 70 | 95 | 8 | 0.9 |
| 13 | EAc | 3,000 | 200 | 1.0 | 6 | 5 | 60 | 94.5 | 8 | 1.5 |

MIBK: Methyl isobutyl ketone
EAc: Ethyl acetate
PGMEA: Propylene glycol methyl ether acetate Referring to FIGS. 7 and 8, it can be seen that the light-absorbing layers formed in Preparation Examples 6 and 7 exhibited higher transmittance in the visible region and higher absorption in the infrared region than the light-absorbing layers formed in Preparation Examples 9 to 13.

In an imaging device in which a near-infrared ray absorbing article is used, in the interest of securing a high quality image, it is required that the near-infrared ray absorbing article has high transmittance in the visible region and high absorption in the near-infrared region, and at the same time, has an optical characteristic of having a haze of less than 0.3% in the typical visible region (e.g., light having a wavelength of about 550 nm).

Therefore, in view of these conditions, it can be confirmed that whereas the light-absorbing layers formed under the conditions of Preparation Examples 6 and 7 had optical properties suitable for an imaging device, the light-absorbing layers formed under the conditions of Preparation Examples 8 to 13 were not suitable for an imaging device. Therefore, it can be seen that in the light-absorbing layer applied to the near-infrared ray absorbing article of the present invention, not only should a specific pigment (e.g., pigment having an absorption maximum, such as the first pigment) be dispersed in the form of particles, but the size of the particles should be within the range specified in the present invention.

EXAMPLE 1

Near-Infrared Ray Absorbing Article

A near-infrared ray absorbing article was manufactured according to the following procedure.

(1) Composition for Forming First Light-Absorbing Layer

Based on 100 parts by weight of the polyacrylate-based binder, 1 part by weight of the first pigment, 500 parts by weight of methyl isobutyl ketone, and 0.2 parts by weight of the dispersant were introduced and dispersed for about six hours using dispersion equipment and 0.5 mm zirconia beads, and after confirming the presence of particles having an average particle diameter of about 0.1 μm using a particle size analyzer, the resultant was passed through a filter, and thereby a composition for forming a first light-absorbing layer was obtained.

(2) Composition for Forming Second Light-Absorbing Layer

A composition for forming a second light-absorbing layer including the second pigment present in a dissolved state was prepared by mixing the polyacrylate-based binder, and 5 parts by weight of the second pigment and 500 parts by weight of methyl isobutyl ketone based on 100 parts by weight of the polyacrylate-based binder.

(3) Adhesive Composition

An adhesive composition was prepared by mixing a commercially available polyacrylate resin and a commercially available polyisocyanate-based resin in the weight ratio of 99:1.

(4) Strengthening of Glass Substrate

1) The aluminosilicate glass was washed with an aqueous alkali solution to obtain a glass substrate having a thickness of about 0.1 mm.

2) The glass substrate was immersed in a potassium nitrate solution and the solution was thermally treated at a temperature of 390° C. for about 40 minutes, and thereby a glass substrate including a first compressive stress layer and a second compressive stress layer, each having a thickness of about 17.5 μm, formed on each surface of the glass substrate was obtained.

(5) Near-Infrared Ray Absorbing Article (Having a Structure of Glass Substrate/First Light-Absorbing Layer/Adhesive Layer/Second Light-Absorbing Layer)

The composition for forming a first light-absorbing layer was applied onto one surface of the glass substrate by spin-coating and thermally treated at a temperature of about 140° C. for about two hours, and thereby a first light-absorbing layer having a thickness of about 3 μm was obtained.

Subsequently, the above-described adhesive composition was applied onto the first light-absorbing layer by performing spin-coating at a speed of 1,000 rpm for 15 seconds and thermally treated at a temperature of about 130° C. for about 15 minutes, and thereby an adhesive layer having a thickness of about 0.4 μm was obtained.

Subsequently, the composition for forming a second light-absorbing layer was applied onto the adhesive layer by spin-coating and thermally treated at a temperature of 140° C. for about three hours, and thereby a second light-absorbing layer having a thickness of about 3 μm was obtained.

EXAMPLE 2

Near-Infrared Ray Absorbing Article

A near-infrared ray absorbing article was manufactured in the same manner as in Example 1 except that a first light-absorbing layer in which the first pigment was dispersed in the form of particles having an average particle diameter of about 0.5 μm was formed by controlling a solvent type and dispersion conditions to be the same as those applied in Preparation Example 7, which are shown in Table 2.

EXAMPLE 3

Near-Infrared Ray Absorbing Article

A near-infrared ray absorbing article was manufactured in the same manner as in Example 1 except that a composition for forming a second light-absorbing layer was prepared by mixing the polyacrylate-based binder, and 1 part by weight of the second pigment, 3 parts by weight of the third pigment, 0.1 parts by weight of the fourth pigment, and 500 parts by weight of methyl isobutyl ketone based on 100 parts by weight of the polyacrylate-based binder.

COMPARATIVE EXAMPLE 1

Near-Infrared Ray Absorbing Article
(1) Composition for Forming Light-Absorbing Layer After mixing the polyacrylate-based binder, and 1 part by weight of the first pigment, 5 parts by weight of the second pigment, and 500 parts by weight of methyl isobutyl ketone based on 100 parts by weight of the polyacrylate-based binder, 0.2 parts by weight of the dispersant added to the mixture, and particles were dispersed for about six hours using dispersion equipment and 0.5 mm zirconia beads. Subsequently, using a particle size analyzer, it was confirmed that first pigment particles had an average particle diameter of about 0.1 μm and that the second pigment was present in a dissolved state, and thereby a composition for forming a light-absorbing layer was obtained.
(2) Strengthening of Glass Substrate A glass substrate was strengthened in the same manner as described in Example 1.
(3) Near-Infrared Ray Absorbing Article The composition for forming a light-absorbing layer was applied onto one surface of the tempered glass substrate by spin-coating and thermally treated at a temperature of about 140° C. for about two hours, and thereby a light-absorbing layer having a thickness of about 3 μm was obtained.

COMPARATIVE EXAMPLE 2

Near-Infrared Ray Absorbing Article

A near-infrared ray absorbing article was manufactured in the same manner as in Example 1 except that a first light-absorbing layer in which the first pigment was dispersed in the form of particles having an average particle diameter of about 1.1 μm was formed by controlling a solvent type and dispersion conditions to be the same as those applied in Preparation Example 8, which are shown in Table 2.

COMPARATIVE EXAMPLE 3

Near-Infrared Ray Absorbing Article

A near-infrared ray absorbing article was manufactured in the same manner as in Example 1 except that a first light-absorbing layer in which the first pigment was dispersed in the form of particles having an average particle diameter of about 3.0 μm was formed by controlling a solvent type and dispersion conditions to be the same as those applied in Preparation Example 12, which are shown in Table 2.

COMPARATIVE EXAMPLE 4

Near-Infrared Ray Absorbing Article

A near-infrared ray absorbing article was manufactured in the same manner as in Example 1 except that a first light-absorbing layer in which the first pigment was dispersed in the form of particles having an average particle diameter of about 5.0 μm was formed by controlling a solvent type and dispersion conditions to be the same as those applied in Preparation Example 13, which are shown in Table 2.

COMPARATIVE EXAMPLE 5

Near-Infrared Ray Absorbing Article

A near-infrared ray absorbing article was manufactured in the same manner as in Example 1 except that a composition which had been prepared by mixing the polyacrylate-based binder, and 5 parts by weight of the first pigment and 500 parts by weight of cyclohexanone based on 100 parts by weight of the polyacrylate binder and in which the first pigment was present in a dissolved state was used as a composition for forming a first light-absorbing layer.

Figure 9:
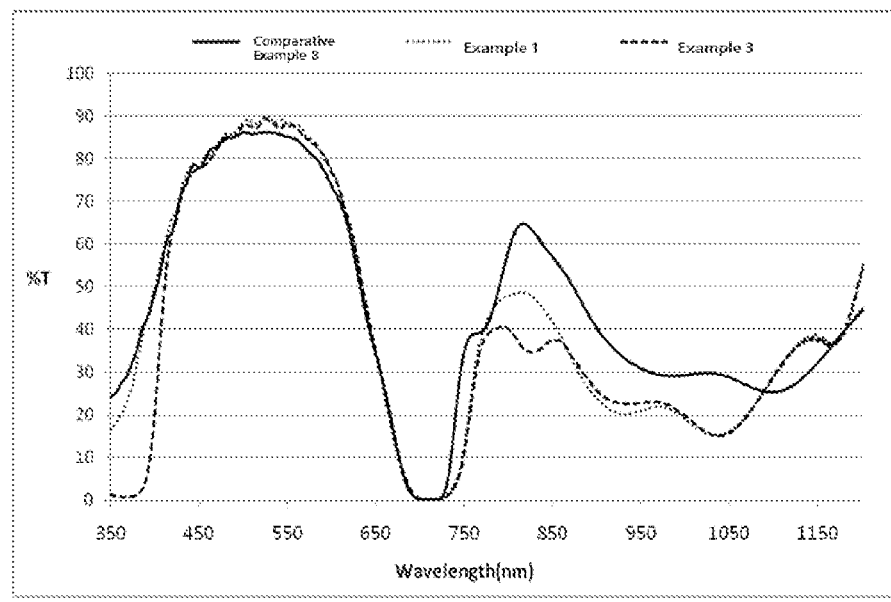
FIG. 9 is a set of transmittance spectra of Examples 1 and 3 and Comparative Example 1.
Figure 10:
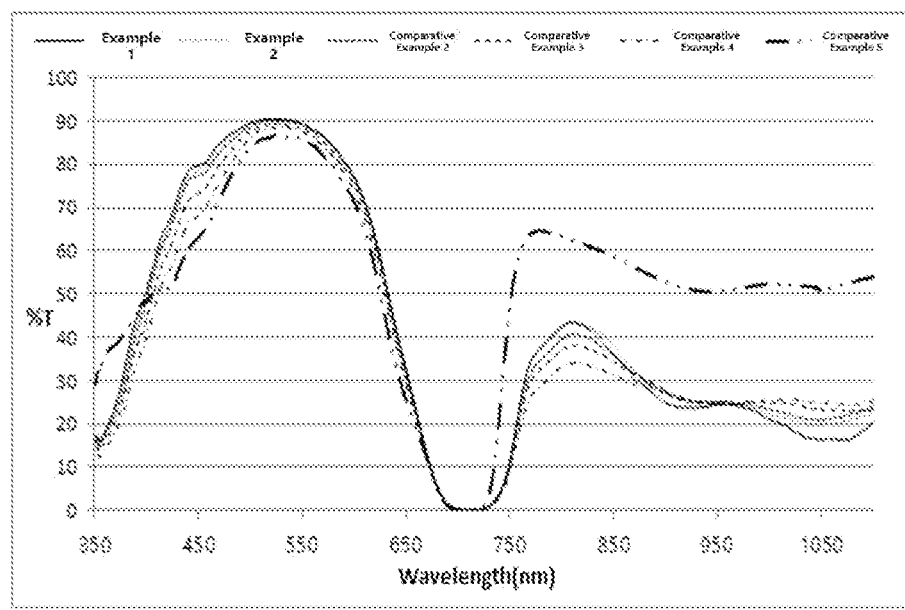
FIG. 10 is a set of transmittance spectra of Examples 1 and 2 and Comparative Examples 2 to 4.

The transmittance spectra of the near-infrared ray absorbing articles of Examples 1 to 3 and Comparative Examples 1 to 5 are shown in FIGS. 9 and 10, and a summary of structural characteristics of the near-infrared ray absorbing articles of Examples and Comparative Examples and transmittance thereof in the main wavelength bands are shown in Table 3.

TABLE 3

| Classification | First light-absorbing layer First pigment (Average particle diameter, μm) | Second light-absorbing layer Second pigment (Physical conditions) | Light transmittance (%) | | |
|---|---|---|---|---|---|
| | | | @425 nm | @550 nm | @1050 nm |
| Example 1 | Diimmonium-based (0.1) | Squarylium-based (Dissolved) | 68.9 | 89.9 | 16.5 |
| Example 2 | Diimmonium-based (0.5) | Squarylium-based (Dissolved) | 67.6 | 89.3 | 20.0 |
| Comparative Example 1 | Squarylium-based (Dissolved), Diimmonium-based (0.1) | | 68.0 | 85.0 | 28.7 |
| Comparative Example 2 | Diimmonium-based (1.1) | Squarylium-based (Dissolved) | 67.1 | 88.8 | 21.2 |
| Comparative Example 3 | Diimmonium-based (3.0) | Squarylium-based (Dissolved) | 62.2 | 88.1 | 23.4 |

TABLE 3-continued

| Classification | First light-absorbing layer First pigment (Average particle diameter, μm) | Second light-absorbing layer Second pigment (Physical conditions) | Light transmittance (%) | | |
|---|---|---|---|---|---|
| | | | @425 nm | @550 nm | @1050 nm |
| Comparative Example 4 | Diimmonium-based (5.0) | Squarylium-based (Dissolved) | 57.3 | 87.4 | 24.8 |
| Comparative Example 5 | Diimmonium-based (Dissolved) | Squarylium-based (Dissolved) | 52.45 | 85.33 | 51.85 |

Referring to FIG. 9 and Table 3, it can be seen that the visible transmittance and near-infrared absorption of the near-infrared ray absorbing articles of Examples 1 to 3 were improved compared to those of the near-infrared ray absorbing article of Comparative Example 1. From this, it can be seen that compared to near-infrared ray absorbing articles in which a single light-absorbing layer was formed, the near-infrared ray absorbing article as specified in the present invention, in which a plurality of light-absorbing layers separated from each other were used, had improved optical properties. In addition, from this, it can also be seen that the near-infrared ray absorbing article having a structure as specified in the present invention had improved heat resistance. This is presumed to be because no interaction had occurred between organic materials such as a plurality of pigments applied to the light-absorbing layers.

Referring to FIG. 10 and Table 3, it can be seen that the transmittance spectra shown in FIG. 10 and the transmittance spectra shown in FIGS. 7 and 8 showed a similar tendency based on the average particle diameter of the first pigment present in the form of particles in the first light-absorbing layers.

In addition, it can be seen that in the case of the near-infrared ray absorbing article of Comparative Example 5, in which light-absorbing layers having different optical properties were separated from each other but none of the light-absorbing layers contained a pigment dispersed in the form of particles (e.g., first pigment), infrared absorption was reduced. It is understood that this is particularly due to the degradation caused by the first pigment.

That is, it can be seen that in the case of the near-infrared ray absorbing article of the present invention, irrespective of whether the light-absorbing layers containing pigments having different optical properties (e.g., absorption maximum) were separated from each other, particularly only when a specific pigment was dispersed in the form of particles in the light-absorbing layers and the size of the particles was within the range specified in the present invention, excellent visible transmittance and excellent near-infrared absorption were attained.

Therefore, it can be seen that when, in the near-infrared ray absorbing article, any one specific pigment was contained in a dissolved state in the light-absorbing layer, optical properties were degraded due to the interaction between the pigments.

In addition, it can be seen that when a specific pigment used in the light-absorbing layer was dispersed in the form of particles but the light-absorbing layer was formed as a single layer, or when the light-absorbing layers were divided as two layers separated from each other but the particle size of a specific pigment in the form of particles did not satisfy the range as specified in the present invention, the infrared absorbing ability and visible transmittance of the near-infrared ray absorbing article decreased.

Meanwhile, in the near-infrared ray absorbing article of the present invention, since a plurality of light-absorbing layers were formed and the light-absorbing layers were separated from each other according to the properties of the pigments applied thereto, the stability between the pigments and/or the light-absorbing layers was ensured. In addition, it can be seen that in the near-infrared ray absorbing article of the present invention, since a pigment having specific optical properties was dispersed in the form of particles in any one of the plurality of light-absorbing layers, remarkably improved visible transmittance and infrared absorption were secured.

In addition, it can be seen that the optical property evaluation result of the light-absorbing layer containing the first pigment and the optical property evaluation result of the near-infrared ray absorbing article manufactured based on the light-absorbing layer had a similar tendency, and from this, it can be seen that the optical properties of the near-infrared ray absorbing article were mainly determined by the optical properties of the first light-absorbing layer containing the first pigment.

As described above, since the near-infrared ray absorbing article of the present invention exhibited high visible transmittance and high near-infrared absorption and had a low haze, for example, of less than 3%, in the visible region, it can be expected that when the ray absorbing article is applied to an imaging device, an image of excellent quality can be obtained.

The near-infrared ray absorbing article of the present invention is capable of preventing a decrease in visible transmittance and near-infrared absorption due to the interaction between a plurality of organic materials forming the light-absorbing layers.

In addition, the near-infrared ray absorbing article of the present invention has the advantage of being able to be thinner.

In addition, the near-infrared ray absorbing article of the present invention has the advantage of excellent mechanical properties such as strength and heat resistance.

What is claimed is:
1. A near-infrared ray absorbing article comprising:
a glass substrate; and
a first light-absorbing layer and a second light-absorbing layer separated from each other,
wherein the first light-absorbing layer has an absorption maximum at any one wavelength within a wavelength range of 850 nm to 1,200 nm, and the second light-absorbing layer has an absorption maximum at any one wavelength within a wavelength range of 650 nm to 750 nm,
wherein the first light-absorbing layer includes a first binder resin and a first pigment, the first pigment being as a form of particles particle dispersed in the first binder resin and having an average particle diameter of 1 μm or less, and wherein the second light-absorbing layer includes a second binder resin and a second pigment, the second pigment being as a form of non-particle for coloring the second binder resin, wherein the glass substrate has a three-point flexural strength of 360 MPa or more as measured in accordance with the ASTM D790 standard, and wherein a thickness of the glass substrate is in a range of 0.07 mm to 0.3 mm.

2. The near-infrared ray absorbing article of claim 1, wherein the first pigment includes a compound represented by Chemical Formula 1:

[Chemical Formula 1]

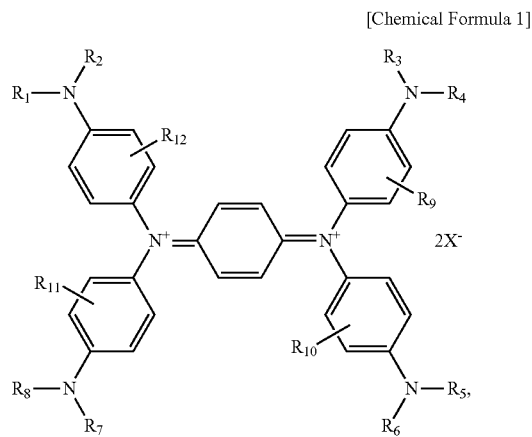

wherein, in Chemical Formula 1, $R_1$ to $R_8$ are each independently a hydrogen atom, an alkyl group, an aryl group, an aralkyl group, an alkenyl group, or an alkynyl group, $R_9$ to $R_{11}$ are each independently a hydrogen atom, a halogen group, an amino group, a cyano group, a nitro group, a carboxyl group, an alkyl group, or an alkoxy group, and X is an anion.

3. The near-infrared ray absorbing article of claim 1, wherein the second pigment includes a compound represented by Chemical Formula 2:

[Chemical Formula 2]

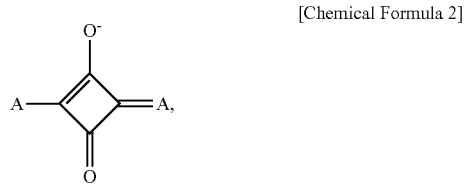

wherein, in Chemical Formula 2, A is an aminophenyl group, an indolyl methylene group, an indolinyl group, or a perimidine group, and two A's centered about

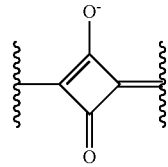 [SMILES: *C1=C([O-])C(=*)C1=O]

are conjugated with each other, and any one or more of hydrogens present in the aminophenyl group, indolyl methylene group, indolinyl group, or perimidine group are each independently hydrogen, a halogen group, a hydroxyl group, a cyano group, a nitro group, a carboxyl group, a C1-C20 alkyl group, a C3-C20 cycloalkyl group, a C1-C10 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group.

4. The near-infrared ray absorbing article of claim 3, wherein, in the Chemical Formula 2, any one or more of hydrogens present in the aminophenyl group, indolyl methylene group, indolinyl group, or perimidine group are each independently substituted with a C6-C20 aryl group, and one or more hydrogens of the aryl group are additionally substituted with a C1-C4 alkyl group or a C1-C4 alkoxy group.

5. The near-infrared ray absorbing article of claim 1, wherein the first light-absorbing layer is provided on an opposite side of the second light-absorbing layer based on the glass substrate.

6. The near-infrared ray absorbing article of claim 1, comprising the glass substrate, the first light-absorbing layer, and the second light-absorbing layer in the order as written or the glass substrate, the second light-absorbing layer, and the first light-absorbing layer in the order as written.

7. The near-infrared ray absorbing article of claim 6, further comprising a separation layer provided between the first light-absorbing layer and the second light-absorbing layer.

8. The near-infrared ray absorbing article of claim 1, wherein the glass substrate includes a first compressive stress layer provided on a first main surface of the glass substrate and a second compressive stress layer provided on a second main surface which is a main surface opposite the first main surface.

9. An optical apparatus comprising:
the near-infrared ray absorbing article of claim 1; and
a selective wavelength reflection layer provided on one or both surfaces of the near-infrared ray absorbing article.

10. The optical apparatus of claim 9, wherein the selective wavelength reflection layer includes a dielectric multilayer film.

11. The optical apparatus of claim 10, wherein, in the dielectric multilayer film, a dielectric film having a refractive index of 1.4 to 1.6 and a dielectric film having a refractive index of 2.1 to 2.5 are alternately stacked.

* * * * *